UNITED STATES PATENT OFFICE.

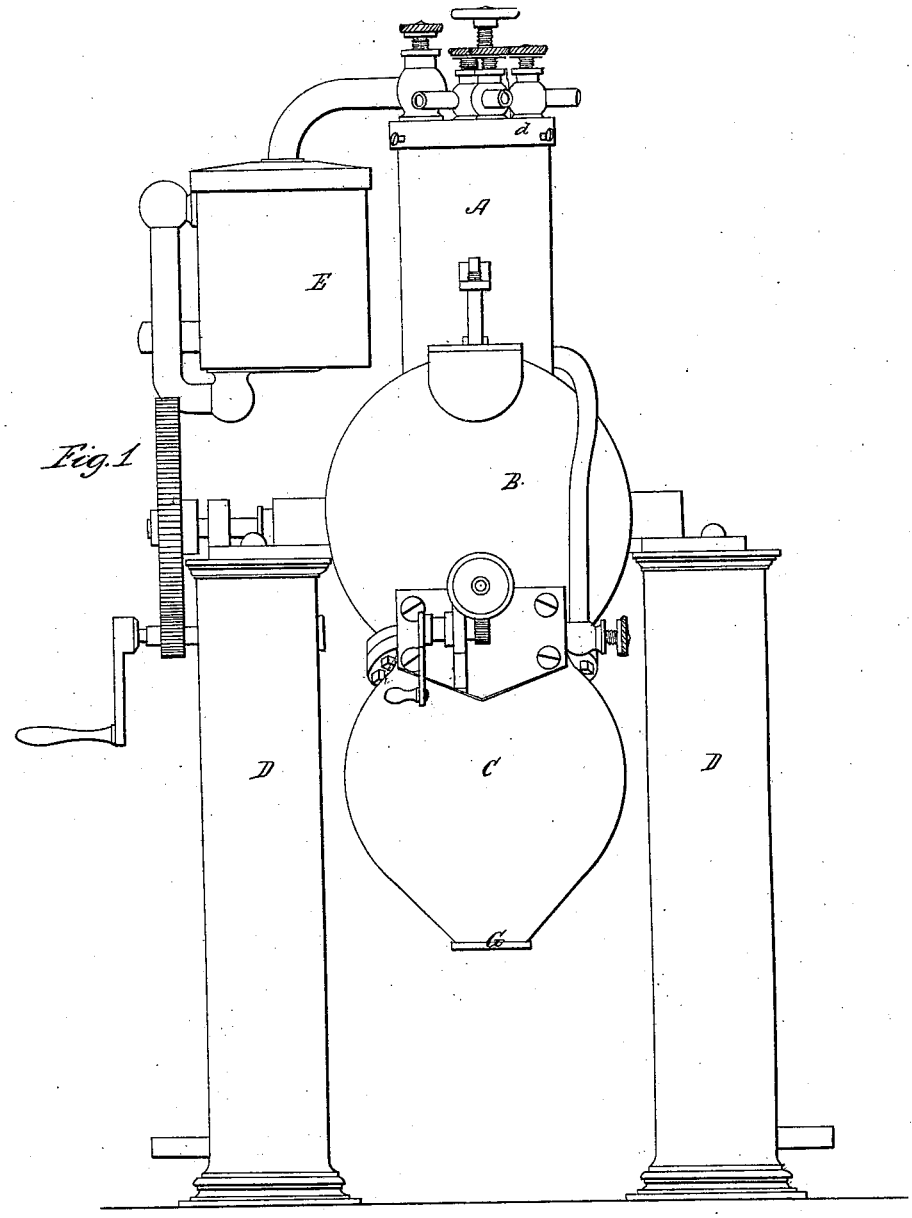

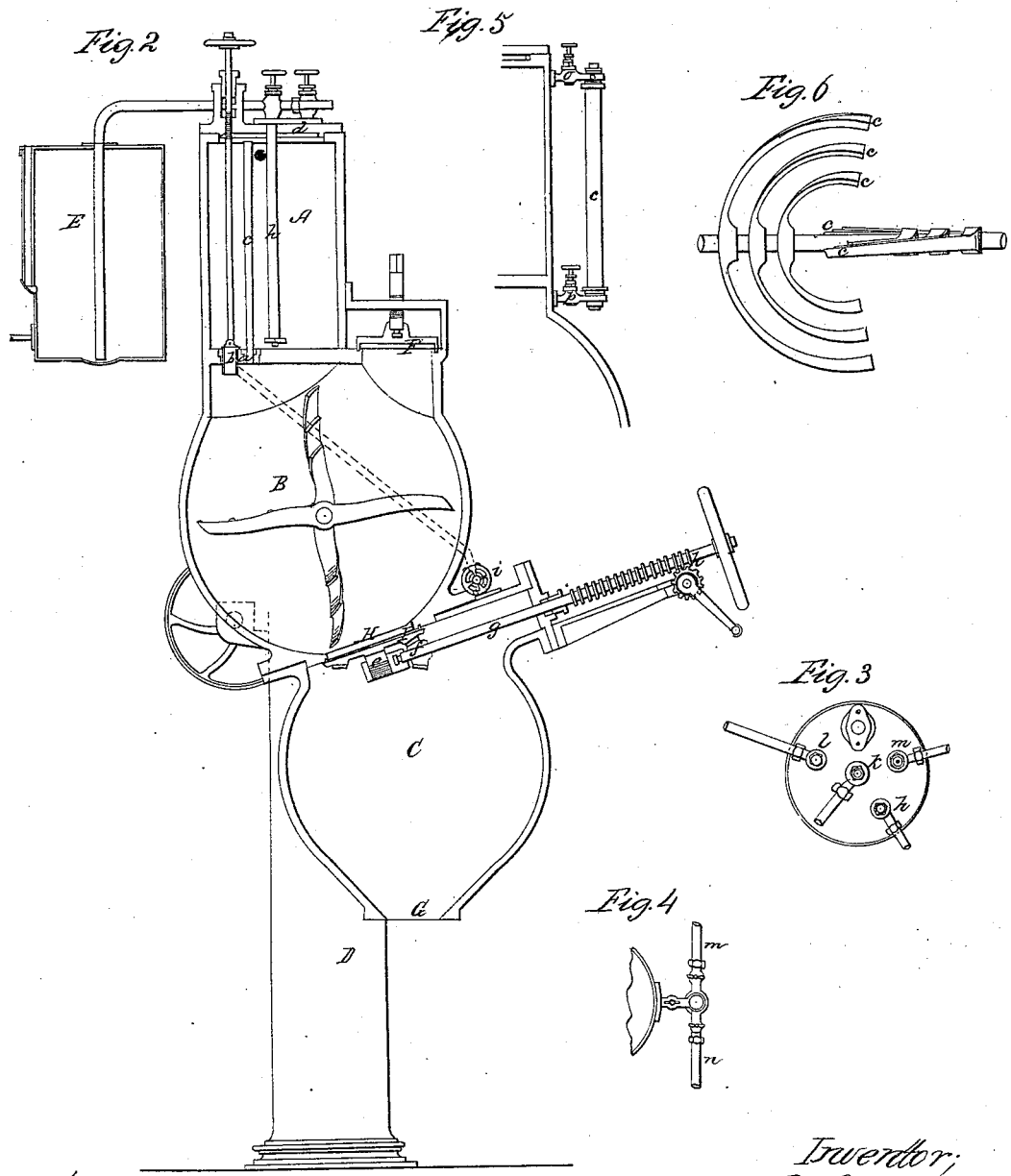

ROBERT LUKE HOWARD, OF LONDON, AND JOHN DANGLISH, OF READING, ENGLAND, ASSIGNORS TO STEUBEN T. BACON, OF BOSTON, MASS.

IMPROVED APPARATUS FOR MAKING AERATED BREAD.

Specification forming part of Letters Patent No. 52,252, dated January 23, 1866.

*To all whom it may concern:*

Be it known that we, ROBERT LUKE HOWARD, of No. 85 Upper White Cross Street, in the county of Middlesex, and JOHN DANGLISH, of Reading, in the county of Berks, both of England, in the Kingdom of Great Britain, have jointly invented certain new and useful Improvements in Apparatus for Making Aerated Bread; and we do hereby declare that the following, taken in connection with the drawings which accompany and form part of this specification, is a description of our invention sufficient to enable those skilled in the art to practice it.

Said improvements relate, first, to the mode of discharging the dough; second, to the apparatus for mixing and making the dough.

Hitherto in the manufacture of aerated bread it has been customary to discharge the dough in paste from the mixing-vessel in which it has been prepared through certain regulated openings, in such a manner that it may be divided into separate pieces or quantities, each suitable for one loaf, as it issues, under pressure, from the mixer. By this former method it will be seen that the mixing apparatus has to remain idle while the operation of making the dough into loaves is being performed, and, vice versa, the apparatus for discharging the dough has to remain idle while the mixing or preparing the dough is being performed.

The chief object of our invention is to avoid the delay consequent upon the aforesaid mode of operating, and this we accomplish by placing between the mixing-vessel and the apparatus through which the dough is to be discharged for division into loaves a vessel or chamber, into which the dough may be discharged in bulk from the mixer, in which vessel or chamber is to be retained a sufficient pressure of gas to prevent any injurious expansion or vesiculation of the dough, and to effect its discharge therefrom through the regulating apparatus for making into loaves, which is to be affixed thereto, instead of to the mixing-vessel, as heretofore.

One part of our invention consists in the employment of the said receiving-chamber in connection with the mixing-vessel.

Other parts of our invention consist in the details of construction and arrangement, to be more fully described hereinafter, by which the mixing and other bread-making operations are facilitated.

Referring to the drawings, Figure 1 is a front elevation of an apparatus embodying our invention. Fig. 2 is a central vertical section taken through the apparatus. Fig. 3 is a plan of the top of the vessel A. Figs. 4 and 5 are detail views of modifications to be referred to hereinafter. Fig. 6 is a side view of mixing-arms shown detached from the apparatus.

Similar letters refer to similar parts in all the figures.

A is the water-vessel, B the mixing-vessel, and C the intermediate vessel, which we call the "receiver." These three vessels are connected, and are supported by two hollow columns, D, which are of large diameter in proportion to the height, and with a firm foundation make a sufficient frame for the apparatus, while the columns form air-tight receivers, in which the gas used in the manufacture of bread is condensed by any suitable pumping system.

It will be observed that the water and mixing vessels A and B are formed in one casting, and when the metal in these or in the receiver C is such as is liable to be affected chemically by their contents, we paint their interiors with a suitable coating, preferably with a hot mixture of bees-wax and rosin in equal parts, the metal being warm when the application is made. The top of the water-vessel is cast open, and has a cover, D, fitted thereunto.

In the plate or diaphragm which separates the water-vessel from the mixer there is an opening left in the casting, into which is fitted a metal plate, *a*, this being provided with a valve, *b*, and an equilibrium-pipe, *c*. The valve *b* is arranged to be worked by a rod which extends upward through a packing-box in the cover of A. The object of the equilibrium-pipe is to effect a communication between the upper parts of the vessels A and B for the free passage of gas. Instead of placing the equilibrium-pipe as described and shown, it may be placed on the outside of the apparatus, with its ends communicating, as just mentioned, and wherever placed it may be provided with a stop-cock, to be operated, when necessary, for the purpose of charging the water-vessel with water and aerating and preparing it for a succeeding mixing while the previous charge is being mixed and kneaded into dough.

The cover $d$ of the water-vessel is shown in plan, Fig. 3, indicating the positions of several cocks and valves through which the water and gas pass. The center cock, $k$, is attached to a pipe which passes downward into the water-vessel nearly to its bottom, where it is provided with a distributing-rose, which spreads or divides the gas into minute streams, thus securing due and uniform aeration of the water. Said pipe may be connected with either or both of the gas-reservoirs D. Another cock, $l$, communicates with the vessel E, for the admission of water therefrom into the water-vessel A when the proper quantity has been measured in E, as ascertained by a suitable gage.

Through the cock $m$ communication is had with the vacuum-pump which exhausts the gas, and through the cock $n$ communication is had with the pump which exhausts the air. Or when the equilibrium-pipe $c$ is placed outside of the water-vessel A, as seen in Figs. 4 and 5, the two cocks $m$ and $n$ are placed at the side of the vessel A and in connection with the pipe $c$, instead of on the cover $d$. In this arrangement, by operating the stop-cocks $o$ and $p$ communication can be had through $m$ or $n$ with the interiors of A and B, which, by the pumping apparatus, can be exhausted of air and gas.

The pipe $c$ between the cocks $o$ and $p$ is formed of glass, to enable the operator to detect passage of flour with the gas and air and cause him to take measures to check such passage, which, if allowed, would clog the pipes and derange the operation of the pumps. The gage is provided with screw-plugs, through which any flour which may enter the glass may be cleaned out. The opening and its cover (seen at F) are for the admission of flour into the mixer.

The receiver C tapers to the mouth G, to which is to be attached measuring and discharging apparatus, preferably that described in the United States patent for Dr. Danglish's invention, No. 48,534, dated July 4, 1865. The receiver C is attached by means of flanges to the bottom of the mixer, but slightly toward one side.

The opening communicating between the two vessels is shown at H, and can be opened or closed at will by the slide-valve I. This is in the form of a circular plate with its edge beveled off so as to make an edge at its juncture with the valve-face. On the back of this valve I is a fine-threaded screw, (seen at $e$,) which fits a corresponding nut formed through a bar. This bar fits at its ends into slots or ways formed in or on the receiver, so that the bar may be reciprocated therein.

On the back of the valve I are formed the teeth of a bevel-pinion, $f$. This pinion is fixed on a shaft, $g$, one end of which has its bearing in the bar, while the other end passes through a packing-box in the receiver and protrudes beyond. On the projecting end of $g$ a rack is formed, the teeth of which are concentric collars, into which mesh the teeth of the pinion $h$, so that, however the shaft $g$ is rotated by the hand-wheel thereupon, the teeth of the rack and pinion $h$ will remain in gear.

It will now be obvious that by turning the shaft $g$ the valve I will be made to approach or to recede from its seat, while by turning the pinion $h$ the valve I opens or closes communication between the mixer and the receiver.

The object of giving rotation to the valve I is twofold: first, by lowering it away from its seat to lessen its resistance to reciprocation; second, to grind or evenly spread any dough which may rest on the valve-face, so that when present it shall act as a packing or gasket for the valve instead of causing it to leak.

The mode of using the receiver is as follows: The dough having been mixed by the action of the mixing-arms, these are caused to cease their rotation to allow the dough to settle at the bottom of the mixer. The receiver is then to be filled with gas of a pressure equal to that in the mixer, between which and the receiver communication can be had by means of the equilibrium-pipe, which is fitted with the stop-cock $i$. Equilibrium of pressure having been obtained in the two vessels B and C, the valve I is drawn back and the dough descends by its own gravity into the receiver, displacing its bulk of gas, which finds passage into the mixer through the equilibrium-pipe. This passage of the dough may be facilitated by slow rotation of the mixer-arms. When the dough is all deposited in the receiver the valve I is closed, also the stop-cock $i$, and a fresh mixing of dough may be proceeded with while the dough in the receiver is being measured off and discharged on its passage to the oven.

In Fig. 2 is seen an end view of the mixer-arms, which are shown in elevation in Fig. 6.

Our improvement in the mixer-arms over those heretofore used consists in making them concentric, or nearly so, with the center of the mixer. We prefer the form, arrangement, and number of blades or mixing-arms shown in said figures, there being six blades, each of which is equal to a little more than half a circle, secured on the mixer-shaft by a strong boss or hub, each end of each arm being gradually twisted so as to be at an angle of about forty-five degrees at the extreme ends to their juncture with their hubs. One set of these blades being fixed in one plane, the other set is fixed in another plane at right angle to the first, and the free ends of all the blades are twisted a little in such a direction as will in their rotation act to draw the dough from the mixer-case toward its center, instead of acting in the reverse manner.

We claim—

1. Combining the vessels B and C and apparatus connected therewith, substantially as herein described.

2. The combination, with a mixing-vessel, B, of apparatus, such as is herein described and shown, for mixing the dough, reference being had to Figs. 2 and 6.

In witness whereof we have hereunto set our hands this 29th day of September, A. D. 1865.

ROBERT LUKE HOWARD.
JOHN DANGLISH.

Witnesses as to John Danglish:
EDWARD TUCK,
T. BASSET.

Witnesses to the signing by Robert Luke Howard:
G. F. WARREN,
JOHN DEAN,
*Both of No. 17 Gracechurch street London, E. C.*